Sept. 1, 1925.　　　　　　　　　　　　　　　　　　　　1,552,158
D. HOLLOWAY
INTERNAL COMBUSTION ENGINE
Filed Feb. 18, 1924
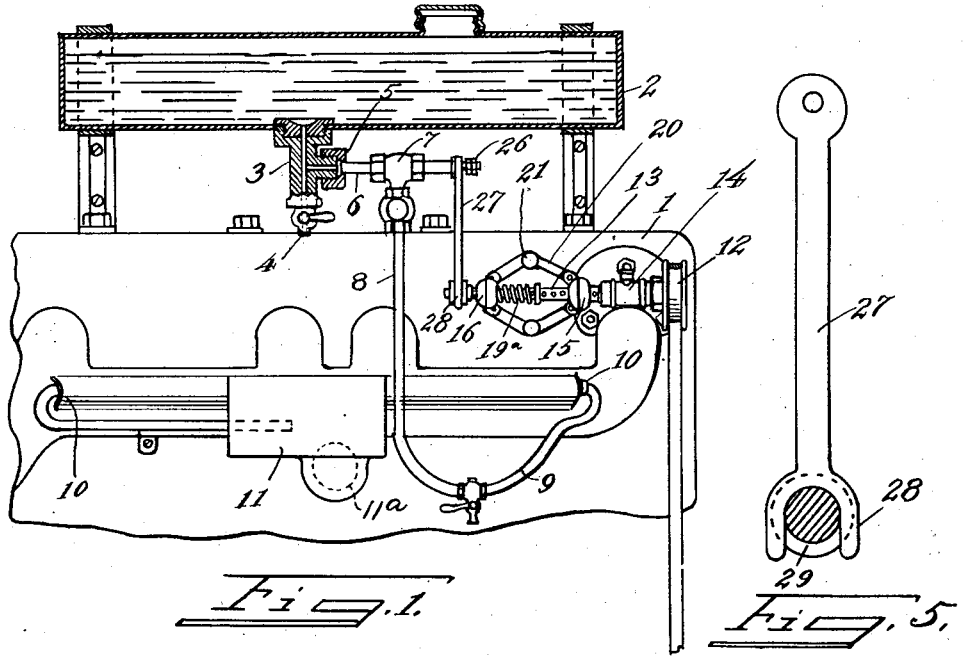
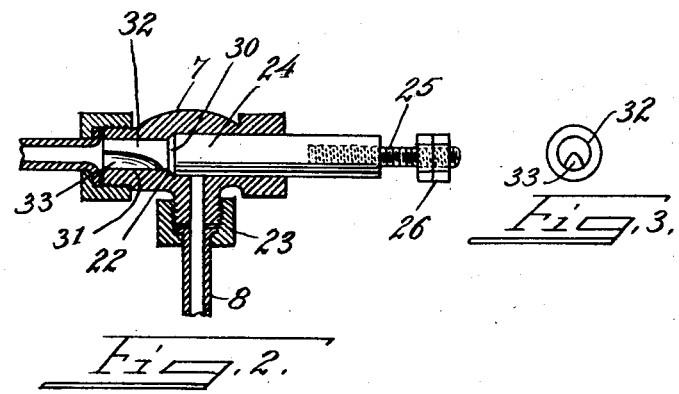
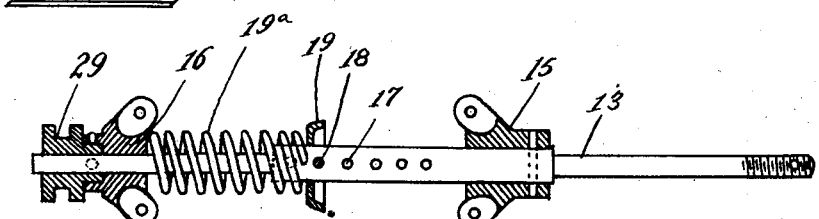
INVENTOR:
David Holloway
BY
Allen & Allen
ATTORNEYS.

Patented Sept. 1, 1925.

1,552,158

UNITED STATES PATENT OFFICE.

DAVID HOLLOWAY, OF REMINGTON, OHIO.

INTERNAL-COMBUSTION ENGINE.

Application filed February 18, 1924. Serial No. 693,480.

*To all whom it may concern:*

Be it known that I, DAVID HOLLOWAY, a citizen of the United States, and a resident of Remington, in the county of Hamilton and State of Ohio, have invented certain new and useful Improvements in Internal-Combustion Engines, of which the following is a full, clear, and exact description, reference being had to the accompanying drawings, forming part of this specification.

My invention relates to devices for use in connection with internal combustion engines which provide an automatically proportioned steam addition to the air intake of the carbureter of the engine.

I am aware that devices have been provided in the past for introducing water into intake manifolds, and also for introduction of vapors from the engine radiators, and from the crank cases of engines into the manifolds.

The main difficulty why these various plans of adding to the efficiency of internal combustion engines, have not proven successful is because there have been no means for providing the proper amount of moisture with reference to the engine operation when the introduction begins.

Furthermore the experiments which I have conducted in automobiles on the road, and brake tests in several universities have indicated to me that the best form in which to introduce moisture into an internal combustion engine, is in the form of a very fine vapor, and particularly to introduce it into the carbureter along with the air used in carburetion.

Without a device which is governor controlled, and in which the amount of flow is automatically measured, it is not possible, so far as I have been able to test it out, to provide a device which will provide suitable quantities of moisture to any engine. Slight changes in manifold and carbureter structure, and differences in stroke and bore, as well as differences in power delivery as compared to revolutions per minute of an engine all result in calling for a moisture delivery which is peculiar to the individual engine in question.

It is thus my object to provide a moisture adding device to internal combustion engines which provides a measured and controllable amount of moisture to the carbureter air intake, under control of a governor operated by the engine.

By so doing I increase the efficiency of the engine by giving a better mixture in the carbureter, preventing formation of carbon by the action of superheated steam on the carbon deposit left by the ignition of compressed fuel charges and thus keeping the valves and cylinder walls clean, I prevent pre-ignition and hence "knock" by the cushioning action of steam within the engine cylinder, and apparently prevent overheating of the engine, and by moisture deposit on the cylinder walls prevent leakage past the piston of unburned liquid fuel above, and lubricating oil from below.

I accomplish my objects by that certain construction and arrangement of parts to be hereinafter more specifically pointed out and claimed.

In the drawings:

Figure 1 is a side elevation of a device built according to my invention.

Figure 2 is a section detail taken longitudinally through the steam inlet valve.

Figure 3 is an end elevation of the valve plunger shown in Figure 2.

Figure 4 is a detail of the governor shaft and connections.

Figure 5 is an elevation of the governor arm.

Referring to the structure shown in the drawings, which is given as an example of my invention, and not as the sole possible embodiment of the principles thereof, I have shown an engine 1, on top of which is mounted a water tank 2, having an outlet fitting 3 with drain cock 4. Connected by a union 5 with the fitting 3 is a pipe 6 which extends to the control valve casing 7.

From the control valve casing the water passes down through a pipe 8 which is formed with a trap portion 9 to provide against back pressure. From the trap the pipe passes into the exhaust manifold 10 of the engine, and thence passes out and into the hot air hood 11, from which the carbureter draws its air for combustion through the hot air opening indicated by the doted circle 11ª in Figure 1.

I have not shown the carbureter, and hot air hoods are now in common use in almost all automobile internal combustion engines. In their essence hot air hoods are mere shells arranged around the exhaust manifolds and extending to the air inlet port of the carbureter.

The governor is formed so as to be adjustable. It is driven from a belt and pulley 12 mounted on the shaft 13, said shaft being journaled in a small casing 14 bolted to the engine by the exhaust manifold bolts. Pinned to the shaft is the fixed collar 15, and sliding on the shaft is the movable collar 16. The shaft is formed with a series of pin holes 17 for a stop pin 18, which pin sets the position of a spring abutment washer 19, mounted over the shaft.

The spring 19ᵃ bears on the movable collar, and adjustment of the washer controls the spring opposition to the action of the governor. The governor arms 20 with weights 21 at their point of articulation to each other, are pivotally secured to the two collars in the usual manner in governors of the type shown.

The preferred valve construction is as follows: The casing 7 is formed with a tapered valve seat 22, and from the chamber within the casing the water outlet fitting 23 couples the chamber with the pipe 8 whence the water flows to the vaporizing section within the exhaust manifold.

The valve plunger 24 is formed with a body of substantially the size of the chamber within the casing, and mounted on the threaded post 25 in the plunger are nuts 26 which retain the operating arm 27. The nuts can be adjusted to locate the arm in proper relation to the governor movable collar, said arm having a fork 28 to engage the groove 29 in the collar.

Ahead of the ground seat 30 on the plunger body, the valve casing is made with a smaller bore as at 31, and the valve plunger is also made smaller at 32. In this portion 32 I cut a V-shaped tapering notch 33, so that as the plunger is pulled away from its seat, the V-shaped notch, tapering toward the seat, will effect a gradual increase in water passage opening. Thus the water flows in through the union 5 and through the V-shaped notch into the larger portion of the valve casing, and thence around the small diameter portion of the plunger and into the outlet fitting.

By adjusting the spring on the governor the engine can be adjusted to start taking in water at say 15 miles per hour, the water increasing gradually up to say 30 miles per hour, at which point it reaches its maximum.

I do not wish to be limited to any kind of a graduated opening valve, but merely show a form of such valve, to illustrate one embodiment of my invention. Valves can be secured on the market which gradually open, or which first gradually open and then gradually close again, as the plunger is withdrawn or the valve stem revolved, as the case may be.

In operation the driver will first obtain a proper setting of the governor and valve, so that during idling and starting he will not obtain any flow of water. He can then drive his engine in the ordinary manner. As the speed increases the water starts flowing into the engine, and the exhaust will heat the water converting it into steam. This steam will blow directly into the hot air intake to the carbureter.

In the mixing chamber, there may be and probably is a full or partial condensation of the steam, but I do not find an accumulation of water in the intake manifold. The operation of the engine on the aqueous mixture of liquid fuel, air and water, is very effective and provides a mixture which cuts carbon accumulation and cleans a dirty engine, cuts out pre-ignition knock, keeps down leakage past the piston rings, and gives a less vibratory action to the engine, as well as cuts down overheating.

Having thus described my invention, what I claim as new and desire to secure by Letters Patent, is:—

1. In an internal combustion engine, means for supplying moisture to the cylinders, comprising an independent water tank, an exhaust heater to convert the water into steam, and a pipe passing through the heater for conveying the water therethrough, and means for ejecting said steam into the hot air intake of the carbureter, and a valve between the water tank and the exhaust heater, said valve having a tapered admission port to effect a gradual increase of water supply as the valve opens with a governor operated by the engine controlling the operation of the valve according to the speed of the engine.

2. In an internal combustion engine, means for supplying moisture to the cylinders, comprising an independent water tank, an exhaust heater to convert the water into steam, and a pipe passing through the heater for conveying the water therethrough, means for injecting the steam together with the mixture into the engine cylinders, and a valve between the water tank and the exhaust heater, said valve having a tapered admission port to effect a gradual increase of supply of water as the valve opens, with a governor operated by the engine controlling the operation of the valve according to the speed of the engine, and a trap in the pipe intermediate the heater and the valve to prevent back pressure.

DAVID HOLLOWAY.